Sept. 18, 1956  H. SAHLIN  2,763,229
LOADING AND UNLOADING APPARATUS
Filed Aug. 30, 1951  3 Sheets-Sheet 1
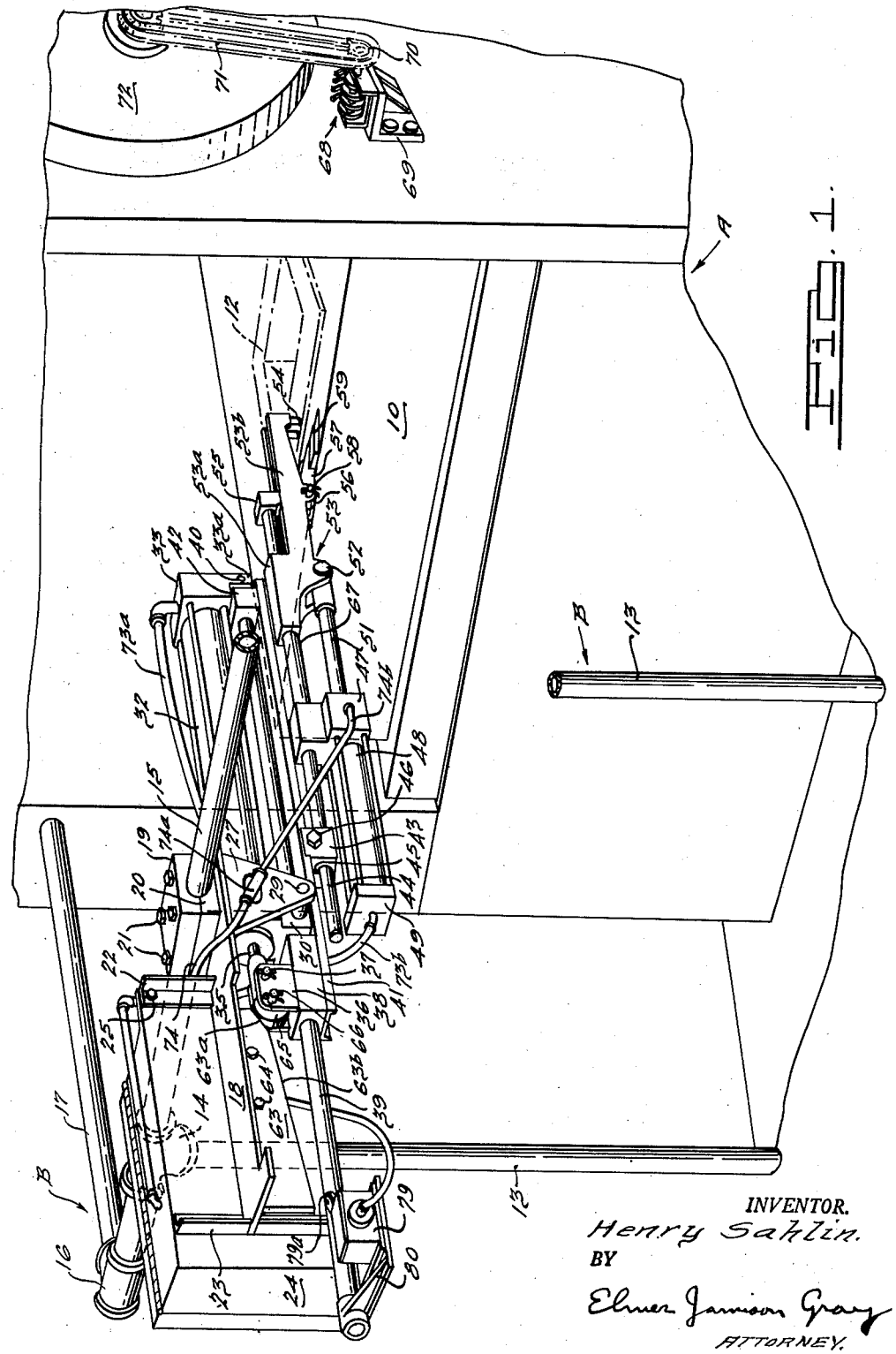
INVENTOR.
Henry Sahlin.
BY
Elmer Jamison Gray
ATTORNEY.

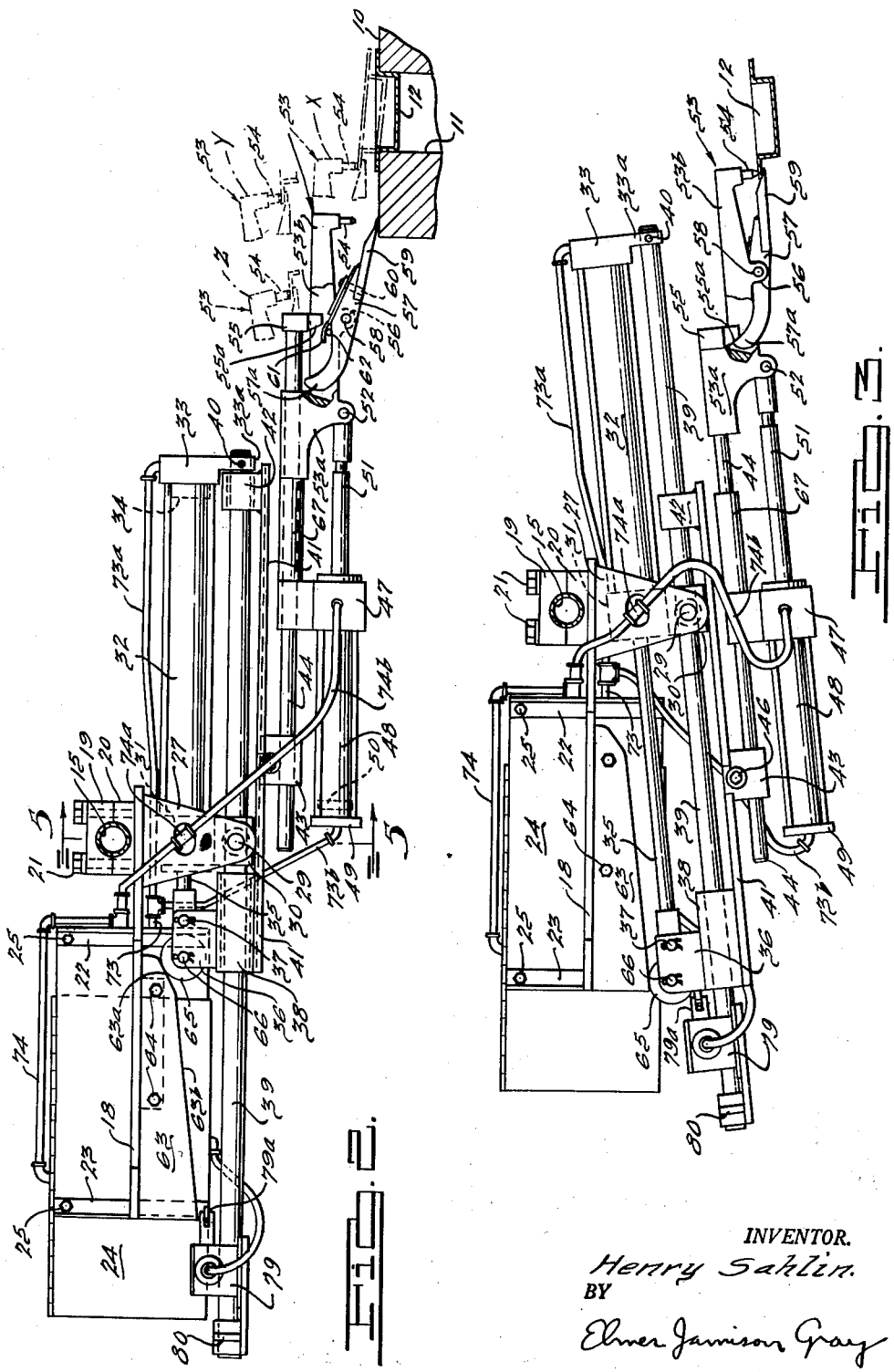

Sept. 18, 1956

H. SAHLIN 2,763,229

LOADING AND UNLOADING APPARATUS

Filed Aug. 30, 1951

INVENTOR.
Henry Sahlin.
BY
Elmer Jamison Gray
ATTORNEY.

United States Patent Office 2,763,229
Patented Sept. 18, 1956

2,763,229

LOADING AND UNLOADING APPARATUS

Henry Sahlin, Birmingham, Mich.

Application August 30, 1951, Serial No. 244,350

14 Claims. (Cl. 113—50)

This invention relates to material handling apparatus and in particular to an apparatus adapted to unload metal stampings, pressed metal panels or other work-pieces automatically from a press or machine, or conversely to load or feed metal blanks or sheets into the press or machine preparatory to the operations of the latter.

An object of the invention is to provide an apparatus adapted to be mounted on or alongside a press or machine and having sliding work gripping or handling means extending toward the press and slidably mounted on a carriage to move independently of the latter toward and from the press, the work handling means being provided with means for gripping or otherwise handling a workpiece, such as a sheet metal blank or stamping, and the carriage being also slidable toward and from the press and pivotally mounted so as to impart vertical motion to the work handling means during travel of the carriage toward or from the machine or press.

In the use of the apparatus, for example, in unloading a stamping or work-piece from a press the carriage upon opening the press is shifted forwardly to dispose the work handling means within the press adjacent the work-piece whereupon this work handling means is shifted relatively to the carriage into position to grip the workpiece. As soon as this occurs the carriage is retracted or shifted rearwardly away from the press carrying with it the work handling means and the work-piece. As the reaward travel of the carriage is initiated there is imparted to the carriage a pivotal motion, such as through the medium of cam means, and as a result the work handling means is elevated to lift the work-piece from the lower die or platen of the press. This operation is accompanied by a rearward travel of the carriage, and hence the work-piece is swung upwardly and rearwardly to a predetermined position whence it is carried away from the press as the carriage is retracted. At the rearward limit of the travel of this carriage the work-gripping means is then retracted, releasing the work-piece, whereupon the cycle of operations is repeated for unloading another work-piece. Pneumatically actuated means is preferably provided for shifting the carriage and work-handling means toward and from the press and also for shifting the gripping jaws of the work-handling means fore and aft so as to grip the work when the carriage reaches its forward limit of travel and to release the work when the carriage reaches its rearward limit of travel. The invention also contemplates, in accordance with one aspect thereof, pneumatically actuated means for feeding a work blank into operative position in the press, the same being accomplished in timed relation to the removal of the work-piece from the press.

Other objects of this invention will appear in the following description and appended claims, reference being had to the accompanying drawings forming a part of this specification wherein like reference characters designate corresponding parts in the several views.

Fig. 1 is a fragmentary perspective view of a press equipped with an apparatus embodying the present invention, taken from the front and one side.

Fig. 2 is an enlarged fragmentary vertical section taken through the die of Fig. 1, showing the operating mechanism in side elevation, several successive positions of the clamping jaws being indicated in phantom.

Fig. 3 is a view in part similar to Fig. 2, but illustrating the position of the operating mechanism when the stamping or panel has been fully withdrawn from the press.

Figure 4:
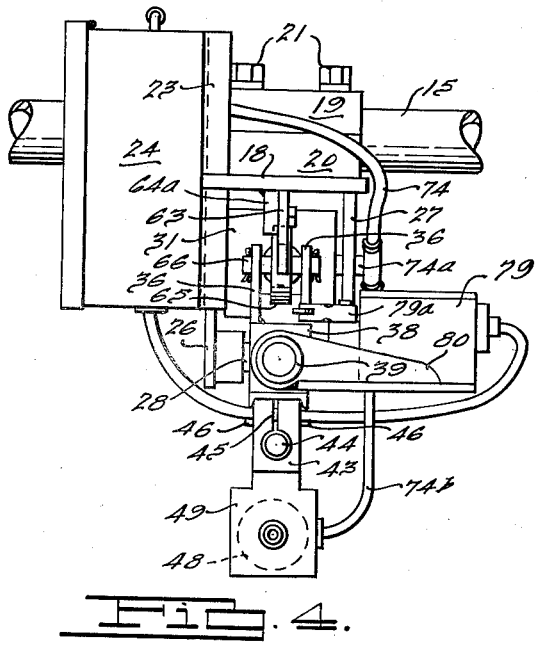
Fig. 4 is an enlarged fragmentary rear end elevation of the apparatus illustrated in Fig. 2.

It is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

Referring to Figs. 1 through 6, an embodiment of the invention is illustrated by way of example as applied to an apparatus operable to unload or withdraw stampings, pressed metal panels or the like from a press. It will be understood that, with suitable changes not affecting the broad concept of the invention, an apparatus embodying the invention may be utilized for loading or feeding blanks into a press. Moreover, although clamping or gripping jaws are employed in the illustrated apparatus for grasping metal stampings or work during its withdrawal from the press, it will be understood that other means for supporting the work during the handling thereof may be employed without departing from the invention in its broader aspects.

In Fig. 1, a press A of any well known or conventional type, such as a stamping press, is shown comprising a bed 10 carrying a lower die 11, Fig. 2. The press is also equipped with the usual vertically reciprocable ram or punch, not shown, cooperable with the die 11 for the purpose of stamping out or drawing a panel 12 from a sheet metal blank 12a, Fig. 7. Adjacent the press to support the unloading mechanism is a tubular frame B comprising a pair of uprights 13 suitably anchored to the floor and connected at their upper ends by T-couplings 14 to a horizontal tubular cross member 15. The latter is connected at its ends by couplings 16 to a pair of horizontal supports 17 which suitably space the member 15 from the body of the press A and are rigidly secured thereto. Although the frame B is permanently secured to the floor and to the press A in the present instance, it will be apparent herein that a suitable rigid portable supporting frame for the unloading mechanism will be employed adjacent the press A if desired.

A generally horizontal panel bracket 18 is welded at its forward end to the underside of a lower clamping block 20 which in turn is clamped to an upper block 19 by means of a plurality of bolts 21. The cross member 15 extends between the blocks 19 and 20, which are frictionally clamped thereto and may thus be shifted transversely along the member 15 or pivoted thereon to a desired position of adjustment upon loosening the bolts 21. Rearward of the blocks 19 and 20, a pair of upright angle iron brackets 22 and 23 are welded to the bracket 18 and are also secured by bolts 25 to a housing 24 carrying the pneumatic and electrical control mechanism.

Figure 5:
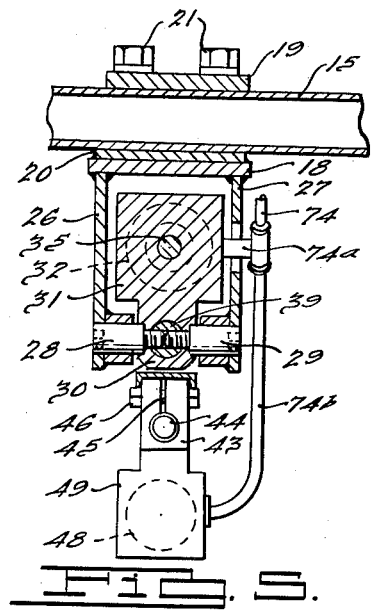
Fig. 5 is an enlarged vertical section taken substantially through lines 5—5 of Fig. 2, looking in the direction of the arrows.

Depending from the bracket 18 and welded thereto at a location below the blocks 19 and 20 are a pair of parallel transversely spaced yoke members 26 and 27, Fig. 5, which support at their lower ends a pair of trunnions 28 and 29 respectively on which is pivoted the reduced lower end 30 of a cylinder supporting block 31. The latter extends upward between the yoke members 26 and 27 so as to be freely pivotal on the trunnions 28 and 29 and provides the support and also the rear end closure for a carriage operating cylinder 32. The latter extends forward toward the press A normally in a generally horizontal direction and is closed at its forward end by a head 33, discussed in more detail below. Reciprocable within the cylinder 32 is a piston 34 (Fig. 6) suitably connected to the forward end of a plunger or piston rod 35 which extends rearward through the block 31 and is connected at its rear end by means of pins 37 to a pair of transversely spaced upright yoke members 36. The yoke members 36 are welded at their lower ends to a slide block 38 slidably mounted on a guide shaft 39 which extends generally parallel to the cylinder 32 and forward toward the press through a lower extension 33a of the end closure or head 33 to which it is secured by a pin 40. As shown in Fig. 5 the guide shaft 39 extends through a hole in the lower portion 30 of block 31 and is provided with opposed tapped holes which receive the reduced threaded ends of the trunnion 28 and 29.

Welded to the underside of the slide block 38 and extending forward therefrom is a channel bracket 41 having its forward end welded to the underside of a second slide block 42. The latter is mounted on the forward extension of the guide rod 39 to slide between the end closure block portions 30 and 33a, Figs. 2 and 3. Rigidly secured to the underside of the bracket 41 is a pinch block 43 to which is secured a second guide shaft or rod 44 extending therethrough parallel to the guide rod 39. If desired a plurality of blocks 43 secured to the bracket 41 may be provided for supporting the guide rod 44. The upper portion of the block 43 is provided with a saw slot 45 extending parallel to the shaft 44 above the latter, whereby the block 43 is securely clamped to the rod 44 in adjusted position by tightening a clamping bolt 46 extending through the slotted portions of the block 43.

Slidably mounted on the guide rod 44 forward of the pinch block 43 is a second cylinder supporting block 47 which supports a jaw or clamp actuating cylinder 48 and forms a closure for the forward end of the latter. The rear end of cylinder 48 is closed by an end plate 49. A reciprocating piston 50, Fig. 2 within the cylinder 48 is secured to the rear end of a piston rod 51 which extends forward through the block 47 and is connected at its forward end at 51 to an upper sliding jaw element or member 53. The latter is provided with an integral upper portion 53a slidably mounted on the guide 44 forward of the block 47 and is also provided with a pair of parallel forward extending jaw elements 53b spaced side by side and each provided at its forward end with a depending conically tapered work engaging insert 54. The forward end of the guide rod 44 is provided with a depending striker 55 which extends between the jaw elements 53b and serves both to limit forward movement of the upper jaw element 53 by abutting the element 53a thereof and also to operate a lower pivotal jaw means as described below.

Intermediate the connection 52 and the work engaging elements 54, each upper jaw element or member 53b is provided with a depending boss 56 to which is pivoted a vertically swinging lower jaw element or member 57 by means of a pin 58. The jaw element 57 is provided with a rearward and upward extending tail piece or arm 57a disposed between the parallel spaced upper jaw elements 53b so as to engage a forwardly declined rear cam surface 55a of the striker 55 and to be swung downward thereby from the position of Fig. 2 to the position of Fig. 3 upon forward sliding movement of the jaw elements 53 and 57 along the guide rod 44. In this action, the forward end of the lower jaw element 57 is swung upward about the pivot 56. Extending forward of the lower jaw element 57 and secured thereto by a bolt 60 is a work engaging element 59 terminating in a forward horizontal chisel edge underlying the depending work engaging elements 54 and adapted to cooperate therewith to grip the work. Also secured to the upper portion of the lower jaw element 57 by means of the bolt 60 is a rearwardly extending spring arm 61 having its rearward end overlying a transverse pin 62 extending between the spaced upper jaw elements 53b and secured thereto at a location rearward of the pivot 58. Thus the lower jaw element 57 is yieldingly urged to the open position or clockwise in Figs. 2 and 3 in opposition to the cam induced counter-clockwise pivotal movement resulting as the upwardly curved extension 57a engages the cam surface 55a.

Swinging movement of the guide 39 and sliding carriage assembly from the position of Fig. 2 to the position of Fig. 3, for example, is controlled by means of a guide cam 63 suitably bolted at 64 to a bracket 64a depending from and welded to the underside of this bracket 18, Fig. 4. The cam 63 extends lengthwise of the guide 39 so as to be engaged by a roller 65 journalled on a pin 66 extending between and supported by the yoke members 36 at a location rearward of the pin 37. As indicated in Fig. 2, the forward end of the cam 63 comprises a short declined portion 63a positioned to engage the roller 65 and shift the same rapidly downward about the pivots 28, 29 during the initial rearward movement of the slide blocks 38 and 42 along the guide 39. From the portion 63a, a longer and less steeply declined portion 63b of the cam guides the rearward movement of the roller 65 and sliding movement of the blocks 38 and 42 at substantially a uniform angle. Accordingly, upon rearward travel of the piston rod 35, the carriage assembly, together with guide 39, is initially pivoted rapidly from the position of Fig. 2 to the angular position indicated in Fig. 3 and is thereafter shifted rearward along the guide 39 to the final position of Fig. 3.

By the construction shown, it is apparent that the entire cylinder and guide mechanism, including both cylinders 32 and 48 pivoted at 28, 29 on the yoke members 26, 27, is slidably adjustable along the tubular cross member 15 and is also pivotally adjustable thereon to a desired predetermined operating position by virtue of the releasable clamping blocks 19 and 20. Likewise the work gripping assembly including the jaw elements 53 and 57 is adjustable forward or rearward by means of the pinch block 43 depending from the channel bracket 41 and releasably clamped to the guide rod 44. In operation, the mechanism is shifted to the position of Fig. 2, with the lower work engaging element 59 resting on the lower press bed 10 adjacent but rearward of an edge of the panel 12 to be extracted from the die 11. Upon extension of the plunger 51, the upper jaw member 53, which carries the lower pivotal jaw 57 and is slidably mounted on the lower guide rod 44, is moved forward thereby shifting the guide block 53a toward the striker 55 and shifting the chisel edge of the element 59 under the adjacent edge of the panel 12. Simultaneously the arm 57a engages the cam surface 55a thereby swinging the element 59 of the lower jaw 57 upward toward the work engaging elements 54. The edge of the panel 12 during this operation is lifted from the die 11 and securely gripped between the work engaging elements 54 and 59, as indicated at the phantom position X, Fig. 2. Although operation of the present invention is illustrated by way of example with a chisel type pick-off member 59 to release the plate 12 from the die 11, it will be understood that customary knock-out pins may be employed to release the work-piece 12 from the die 11, in which case other gripping means may be satisfactorily utilized.

After the work-piece 12 is securely gripped between the jaw elements 54, 59, the carriage operating plunger or piston rod 35 is shifted rearward, so as to cause the carriage and cylinder assembly to move rearward and simultaneously swing about the pivots 28, 29 in a compound movement as aforesaid by reason of the engagement between the roller 65 and cam portion 63a. In this latter action, the forward end portions of the carriage assembly swing upward to the phantom position Y, Fig. 2, withdrawing the stamping 12 completely from the die 11. Upon continued rearward movement of the plunger 35 and the roller 65 along the cam portion 63b, the mechanism including the jaw operating cylinder 48, jaw members 53 and 57, and panel 12 are withdrawn bodily rearward and downward from the press to the phantom position Z, Fig. 2. The jaw operating plunger 51 is then retracted, releasing the arm 57a from the striker cam 55a and permitting the work engaging element 59 of the swinging jaw 57 to swing downward to open position as urged by the spring 61. The spring 61 provides positive means independent of gravity for opening the jaws to release the panel 12. The return or rearward movement of the plunger 51 may be limited by a sleeve spacer 67 of a desired predetermined length slidably mounted coaxially on the guide shaft 44 between the block 47 and jaw member 53a. Upon release of the panel from the jaws, the upper carriage actuating plunger 35 is shifted forward so as to return the mechanism to the initial position of Fig. 2.

The above outlined sequential operation is controlled by electro-magnetically actuated pneumatic valves within the housing 24 operated in timed relation with respect to operation of the press A by means of a rotary type cam switch indicated generally by the numeral 68 and mounted on a bracket 69 at the side of the press. The cams of the switch 68 are keyed to a pulley 70 and rotated therewith by means of a sprocket chain 71 driven by a similar sprocket rotating coaxially with the fly wheel 72 of the press, Fig. 1. Accordingly, at a predetermined time in the press operating cycle, i. e. after completion of the stamping operation and withdrawal of the press plunger from the die 11, a momentary electrical contact is made through the cam switch 68 to actuate a control relay and thereby connect air conduit 73, Fig. 2, to a source of pneumatic pressure and also to open air conduit 74 to exhaust. Conduit 73 bifurcates into lines 73a and 73b which are connected with the forward end of the upper cylinder 32 and with the rearward end of the lower cylinder 48 respectively. Similarly conduit 74 bifurcates into lines 74a and 74b which are connected with the rearward end of cylinder 32 and forward end of cylinder 48 respectively. As a result, air pressure delivered into cylinder 32 in advance of piston 34, which rests at the forward end of cylinder 32 at the beginning and end of each cycle, will drive piston 34 rearward. Air pressure delivered into cylinder 48 rearward of piston 50, which rests at the rearward end of cylinder 48 at the beginning and end of each cycle, will drive piston 50 forward.

Figure 6:
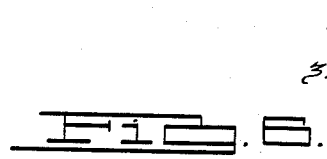
Fig. 6 is an enlarged vertical mid-section taken longitudinally of the front end of the slide operating cylinder, showing the pneumatic time delay means.

As indicated in Fig. 6, the forward face of piston 34 is provided with a pilot 75 which fits closely within a recess 76 in the forward end closure 33. The recess 76 is in communication with pneumatic lines 73a via a radial duct 77 which in turn is in communication with the cylinder 32 forward of the piston 34 through a small bore bleeder duct 78. As long as the pilot 75 is within the recess 76, air duct 73a is substantially closed to the cylinder 32, except for the small bleeder duct 78 which conducts air slowly into the cylinder 32 to drive piston 34 slowly rearward. Upon withdrawal of pilot 75 from recess 76, duct 73a will be in direct communication with cylinder 34 and drive the piston 34 rapidly rearward. Accordingly, after duct 73 is connected to the pneumatic pressure source, rapid rearward movement of piston 34 will be delayed for a predetermined interval of time during which pilot 75 moves out of the recess 76. During this time, however, duct 73b, connected in parallel with duct 73a, will immediately discharge into the rear end of cylinder 48 causing piston 50 and the jaw operating plunger 51 to be immediately shifted forward by virtue of air discharging into the rear end of cylinder 48 through duct 73b. Thus, by reason of the above described delayed action, no appreciable rearward movement of piston 34 will occur before the work gripping jaws 53, 57 have been shifted by piston 50 into position to grip the work 12. The size of the bleeder duct 78 is determined so that as soon as the work 12 is gripped the pilot 75 will have been withdrawn from the socket 76. The piston 34 and plunger 35 will then be forced rapidly rearward, swinging the cylinder and jaw assembly with the gripped panel 12 upward and shifting the same rearward as described above.

At the desired rearward limit of the stroke of the plunger 35, one of the members 36 will engage and trip an actuating arm 79a of a limit switch 79 suitably mounted on a bracket 80 to which the rear end of shaft 39 is secured. Tripping limit switch arm 79a will in turn actuate a control relay within housing 24 to connect pneumatic duct 74 to pressure and duct 73 to exhaust, thereby supplying pneumatic pressure to the rear end of cylinder 32 and to the forward end of cylinder 48 through ducts 74a and 74b respectively and opening the forward end of cylinder 32 and rear end of cylinder 48 to exhaust through conduits 73a and 73b respectively. If desired, a pneumatic delayed action means at the rear end of the cylinder 32, similar to the delayed action means shown in Fig. 6, will delay the rapid forward movement of the carriage operating plunger 35 until after the jaw operating plunger 51 has been retracted to release the panel 12 from the clamping elements 54 and 59, as described above. Thereafter the plunger 35 is rapidly moved forward so as to return the mechanism to the starting position of Fig. 2 for the next cycle of operation.

Figure 7:
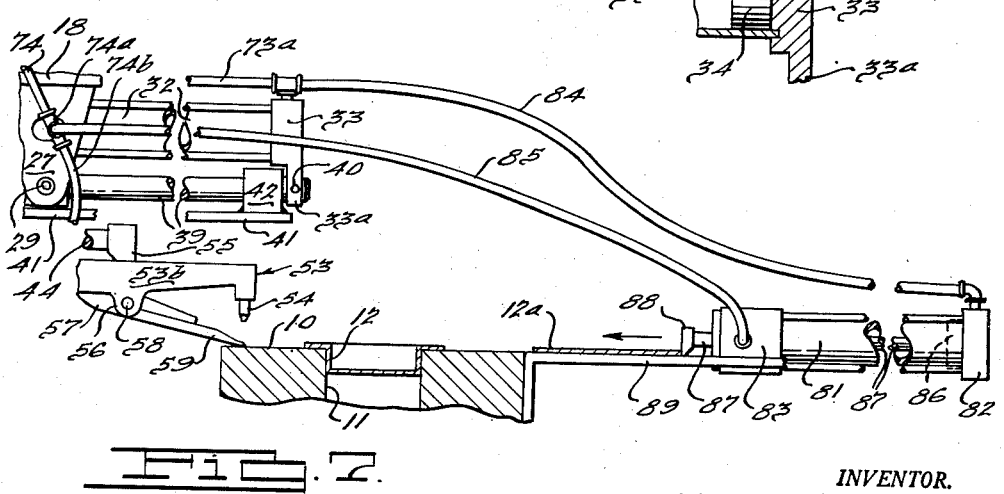
Fig. 7 is a sectional view taken similarly to Fig. 2, illustrating a modification of the present invention.

A modification of the present invention is illustrated in Fig. 7 wherein a horizontal pneumatic cylinder 81 is disclosed having outer and inner end closure plates 82 and 83 respectively and mounted adjacent the side of the press A opposite the jaw members 57 and 53. The outer end of cylinder 81 is connected by an air duct 84 to the duct 73a, which is also in communication with the forward end of the cylinder 32 as aforesaid. The inner end of the cylinder 81 adjacent the press is connected by air duct 85 to duct 74a, which is in communication with the rearward end of cylinder 32. Within the cylinder 81 is a reciprocable piston 86 connected to a horizontal plunger 87 which extends through the closure 83 toward the die 11. The plunger 87 terminates in a pusher element 88 adapted to ride along a work support 89 toward and from the die 11 upon reciprocation of the plunger 87 and thereby to push a blank 12a resting on the support 89 into position over the die 11 upon extension of the plunger 87. By this construction, when cylinder 32 is pressurized so as to drive plunger 35 rearward, air pressure will also be delivered through duct 84 to the end 82 of cylinder 81 most remote from the press, thereby driving piston 86 toward the press simultaneously with operation of the jaw members to grip and extract the completed panel 12 from the die 11. In this regard, the piston 86 will normally rest adjacent the end 82 of the cylinder 81 at the beginning and end of each cycle of operation. The size of the cylinder 81 and rate of air supplied thereto is determined so that the work-piece 12 will be fully withdrawn from the die 11 upon completion of the feed of the blank 12a into position over die 11. This timing is readily accomplished by retarding the movement of the plunger 87 toward the die 11, as for example by a delayed action means comparable to that shown in Fig. 6. Upon the return or forward movement of the plunger 35, air pressure supplied through duct 74a and thence through duct 85 to the end 83 of the cylinder 81 will cause retraction of the plunger 87 to the initial position indicated in Fig. 7.

It will be seen from the foregoing that there is provided herein an improved material handling apparatus adapted to be mounted adjacent a press or machine for unloading work therefrom or loading work therein. This apparatus includes carriage guide means, namely guide shaft 39, extending toward the press as shown in Figs. 1 and 2. Adapted to travel along this guide means toward and from the press is a carriage or carriage means including, in the present embodiment, yoke members 36, slide block 38, bracket 41 and a second slide block 42. Work handling means 53 is carried by the carriage means through the medium of rod 44 secured to a block 43 attached to bracket 41. The carriage means is reciprocated through the medium of power means including cylinder 32, piston 34 reciprocable therein and piston rod 35 connected at its rear end to yoke members 36. The guide means, carriage means, work handling means and power means, above referred to, form a unit adapted to move relatively to the press after engagement of the work handling means with the work preparatory to withdrawing the work from the press. This relative movement is indicated by the dotted line positions X and Y of the work handling means 53 in Fig. 2. Means is provided for initially moving this unit relatively to the press to shift the work generally vertically to a location, indicated by the above referred to dotted line position Y, away from its press operating position shown by the full line position of work 12 in Fig. 2. The means for accomplishing the foregoing comprises, in the present embodiment, the cam surface 63a engaged by roller 65 mounted on yoke members 36. This cam surface may be as steeply inclined as desired so that when acted upon by the roller the work handling means 53 will lift the work in a close to a vertical direction from its press operating position. Thereafter, the above referred to power means operates to shift the carriage means and work handling means, above identified, together with the work 12 from the location or position Y in Fig. 2 away from the press to the position shown in Fig. 3.

I claim:

1. In a material handling apparatus for a press, a support adapted to be mounted adjacent the press, guide means pivoted on the support to swing relatively thereto and adapted to extend toward the press, slide means guided by and adapted to travel along said guide means toward and from the press, material handling means carried by the slide means, fluid actuated means operatively connected with the slide means to shift the same along the guide means toward and from the press, cooperating cam means on the support and slide means for imparting pivotal motion to the guide means during travel of said slide means on said guide means, and means operated in timed relation to the operation of the press for controlling the operation of the fluid actuated means.

2. In a material handling apparatus for a press, a support adapted to be mounted adjacent the press, guide means pivoted on the support and extending toward the press, slide means guided by and adapted to travel along said guide means toward and from the press, material handling means carried by the slide means, fluid actuated means operatively connected with the slide means to shift the same along the guide means toward and from the press, a cam member on the support, a cam element on the slide means cooperable with the cam member, said cam member having successive portions engaged by said cam element for pivoting the guide means during a predetermined initial travel of the slide means along said guide means and for maintaining the guide means in a predetermined angular position during predetermined travel of the slide means away from the press, and means operated in timed relation to the operation of the press for controlling the operation of the fluid actuated means.

3. In a material handling apparatus for a press, a support adapted to be mounted adjacent the press, guide means pivoted on the support to swing about an axis and extending toward the press, slide means adapted to travel along said guide means toward and from the press, material handling means connected to the slide means for travel therewith, power operated means connected to said guide means for swinging movement therewith and connected to the slide means to shift the same toward and from the press, power operated means connected to the work handling means for operating the same, cooperating cam means on the support and slide means for swinging the guide means during travel of the slide means on said guide means, and means actuated in timed relation to operation of the press for controlling the operation of both of said power operated means.

4. In a material handling apparatus for a press, a support adapted to be mounted adjacent the press, guide means pivoted on the support to swing about an axis and extending toward the press, slide means adapted to travel along said guide means toward and from the press, material handling means connected to the slide means for travel therewith, power operated means connected to the slide means to shift the same toward and from the press and connected to said guide means for swinging movement therewith, power operated means connected to the work handling means for operating the same, cooperating cam means on the support and slide means for swinging the guide means upon travel of the slide means, said cam means comprising a fixed cam member on the support and a cam element on the slide means cooperable with the cam member, said cam element to effect sequentially a predetermined pivotal movement of the guide means to swing the material handling means in one direction during initial shifting of the slide means along the guide means and thereafter to effect travel of the slide means away from the press, and means actuated in timed relation to operation of the press for controlling the operation of both of said power operated means.

5. In a material handling apparatus for a press, a support adapted to be mounted adjacent the press, carriage guide means pivotally mounted on the support, a carriage adapted to travel along the guide means toward and from the press, a second guide means carried by the carriage, material handling means movable along the second guide means toward and from the press, and cooperating cam means on the support and carriage for swinging the carriage guide means upon travel of the carriage along the latter.

6. In a material handling apparatus for a press, a support adapted to be mounted adjacent the press, carriage guide means pivotally mounted on the support for swinging movement, a carriage movable along the guide means toward and from the press, a second guide means carried by the carriage, material handling means movable along the second guide means toward and from the press, cooperating cam means on the support and carriage to swing the carriage guide means and the material handling means during a predetermined initial travel of the carriage along its guide means, power operated means connected with the carriage to move the same along the carriage guide means toward and from the press, power operated means connected with the material handling means to move the same toward and from the press, and means for controlling the operation of both power operated means.

7. In a material handling apparatus for a press, a support adapted to be mounted adjacent the press, carriage guide means pivotally mounted on the support for swinging movement, a carriage movable along the guide means toward and from the press, a second guide means carried by the carriage, material handling means movable along the second guide means toward and from the press, cooperating cam means on the support and carriage to swing the carriage guide means and the material handling means during a predetermined initial travel of the carriage along its guide means, power operated means connected to said carriage guide means for swinging movement therewith and connected with the carriage to move the same along the carriage guide means toward and from the press, power operated means connected with the material handling means to move the same toward and from the press, and means for controlling the operation of both power operated means.

8. In a material handling apparatus for a press or machine, a support adapted to be mounted adjacent the press, guide means carried by the support and extending toward the press, slide means adapted to travel along the guide means toward and from the press, work handling means carried by the slide means, power means for reciprocating the slide means; said guide means, slide means, work handling means and power means being pivotally mounted as a unit on the support to pivot about a common axis, means acting on the slide means during initial travel thereof in one direction away from the press for swinging the guide means to a given angular position and thereby swinging the work handling means with the work held thereby away from the press operating position of the work, said slide means during further travel in said direction operating to effect shifting of the work handling means and work away from the press.

9. A material handling apparatus according to claim 8 wherein the means acting on the slide means for swinging the guide means comprises cooperating cam portions adapted to effect sequentially a predetermined pivotal movement of the guide means to swing the material handling means upon initial shifting of the slide means away from the press and thereafter to control further travel of the slide means away from the press.

10. Material handling apparatus adapted to be mounted adjacent a press or machine for unloading work therefrom, comprising carriage guide means extending toward the press, carriage means adapted to travel along the guide means toward and from the press, work handling means carried by the carriage means, power means for reciprocating the carriage means; said guide means, carriage means, work handling means and power means forming a unit, means for mounting said unit for movement relatively to the press after engagement of said work handling means with the work preparatory to withdrawing the work from the press, and means for initially moving said unit relatively to the press to shift the work to a location away from its press operating position, said power means being thereupon operative to shift the carriage means and work handling means together with the work from said location away from the press.

11. Material handling apparatus adapted to be mounted adjacent a press or machine for unloading work therefrom, comprising carriage guide means extending toward the press, carriage means adapted to travel along the guide means toward and from the press, work handling means carried by the carriage means, power means for reciprocating the carriage means; said guide means, carriage means, work handling means and power means forming a unit pivotally mounted to move relatively to the press after engagement of said work handling means with the work preparatory to withdrawing the work from the press, means for operating said power means to shift the carriage means and work handling means together with the work carried thereby entirely away from the press, and means effective prior to said last operation for causing initial movement of said unit relatively to the press to shift the work away from its press operating position.

12. Material handling apparatus adapted to be mounted adjacent a press or machine for unloading work therefrom, comprising carriage guide means extending toward the press, carriage means mounted on said guide means to travel along the guide means toward and from the press, material handling means carried by the carriage means and including work engaging members, fluid actuated means for operating said material handling means to engage the work in the press, a second fluid actuated means separate from said first named fluid actuated means and operative to shift said carriage means and material handling means together with the work carried thereby along the guide means entirely away from the press, and means effective prior to said last operation for initially moving the material handling means relative to the press to dispose the work out of the press operating position.

13. A material handling apparatus according to claim 8 in which the pivotal mounting for the unit is on a horizontal axis whereby the work is raised away from the press operating position.

14. A material handling apparatus according to claim 11 in which the pivotal mounting for the unit is on a horizontal axis whereby the work is raised away from the press operating position.

References Cited in the file of this patent

UNITED STATES PATENTS

| | | |
|---|---|---|
| 1,780,012 | Fine | Oct. 28, 1930 |
| 1,888,440 | Waugh | Nov. 22, 1932 |
| 2,122,648 | Johnson | July 5, 1938 |
| 2,264,826 | Butterfield | Dec. 2, 1941 |
| 2,275,561 | Sahlin | Mar. 10, 1942 |
| 2,278,643 | Braun | Apr. 7, 1942 |
| 2,314,123 | Butterfield | Mar. 16, 1943 |
| 2,494,396 | Littell | Jan. 10, 1950 |
| 2,609,776 | Sahlin | Sept. 9, 1952 |